United States Patent
Übele et al.

(10) Patent No.: US 6,224,123 B1
(45) Date of Patent: *May 1, 2001

(54) GRIPPER APPARATUS

(75) Inventors: André Übele, Aspach; Michael Franz, Ilsfeld, both of (DE)

(73) Assignee: Fritz Schunk GmbH & Co. KG Fabrik fur Spann-und Greifwerkzeuge, Lauffen am Neckar (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/985,871

(22) Filed: Dec. 5, 1997

(30) Foreign Application Priority Data

Dec. 5, 1996 (DE) .............................. 196 50 431

(51) Int. Cl.[7] ..................................................... B25J 15/08
(52) U.S. Cl. .......................... 294/119.1; 901/37; 294/88
(58) Field of Search ................... 294/119.1, 88, 294/81.54, 81.62, 87.1, 901, 902, 907; 901/37, 46; 414/751.1

(56) References Cited

U.S. PATENT DOCUMENTS

| | | |
|---|---|---|
| 4,336,926 | 6/1982 | Inagaki et al. . |
| 4,579,380 * | 4/1986 | Zaremsky et al. ............... 294/119.1 |
| 4,666,367 * | 5/1987 | Sticht ................... 414/751 |
| 4,842,476 * | 6/1989 | Shiotani ............... 414/751 |
| 4,852,928 * | 8/1989 | Monforte ............... 294/119.1 |
| 5,163,729 * | 11/1992 | Bornea et al. ................ 901/37 |
| 5,360,248 * | 11/1994 | Jones ...................... 414/751 |
| 5,529,359 * | 6/1996 | Bornea et al. ................... 294/119.1 |
| 5,595,413 * | 1/1997 | McGeachy et al. ................. 294/88 |
| 5,755,475 * | 5/1998 | Zajac, Jr. ............................ 294/88 |

FOREIGN PATENT DOCUMENTS

| | | | |
|---|---|---|---|
| 3806150A1 | 9/1988 | (DE) . | |
| 3806148 * | 9/1988 | (DE) ................ | 294/119.1 |
| 235219B1 | 6/1989 | (DE) . | |
| 92 14 477 U | 2/1993 | (DE) . | |
| 19513739A1 | 10/1995 | (DE) . | |
| 0022331B1 | 5/1983 | (EP) . | |
| 0 162 439 A1 | 11/1985 | (EP) . | |
| 0532174A1 | 3/1993 | (EP) . | |
| 1437217 * | 11/1988 | (SU) ................ | 294/119.1 |

* cited by examiner

*Primary Examiner*—Robert P. Olszewski
*Assistant Examiner*—Paul T. Chin
(74) *Attorney, Agent, or Firm*—Jones, Tullar & Cooper, P.C.

(57) ABSTRACT

The present invention relates to a gripper apparatus with a housing body having with at least two fixed control rods and at least two gripper fingers which are movable in synchronization in the opening, or respectively closing position, wherein the control rods engage surfaces of the gripper fingers forming cylinder chambers; In order to improve the gripper apparatus in such a way that a more compact structure is obtained, it is distinguished by a center section fixed on the housing, from which respectively one fixed control rod extends in the stroke direction in opposite directions and engages the surface of a respective gripper finger.

11 Claims, 2 Drawing Sheets

GRIPPER APPARATUS

BACKGROUND OF THE INVENTION

1. Field of the Invention

The present invention relates to a gripper apparatus with a housing body and with at least two gripper fingers, which can be moved in a synchronized manner in the opening, or respectively closing direction.

2. Background Art

Gripper devices of this type are known in large numbers.

In accordance with EP 0 532 174 A1, the gripper fingers are guided by means of rods, which can be displaced in the housing and which also cause synchronization, and can be moved back and forth by means of piston rods, which enter cylinder chambers in the housing body. The stroke is short, compared with the structural chamber of the gripper device.

Gripper devices furthermore have become known, wherein the gripper fingers are moved apart, or respectively toward each other by means of base cheeks, which are arranged next to each other and are displaceable. This is disadvantageous in that it is necessary to provide angled end sections for the gripper fingers, if their gripping areas are to be aligned with each other.

SUMMARY OF THE INVENTION

It is therefore an object of the present invention to provide a gripper apparatus of the type mentioned at the outset which is inproved in such a way that it can be produced more cost-effectively and has a reduced structural chamber, so that the apparatus as a whole appears more compact.

This object is attained by a gripper apparatus of the type mentioned, which is distinguished in that respectively one control rod fixed on the housing extends away in the stroke direction in a respectively opposite direction from a center part, which is fixed in place on the housing, and engages a recess of a respective gripper finger constituting a cylinder chamber.

It is possible by means of the preferred embodiment in accordance with the present invention to considerably reduce the gripper chamber volume in relation to the work stroke of the gripper apparatus, and therefore the apparatus can be embodied to be more symmetrical, which has been shown to be advantageous from a manufacturing point of view. By means of the center part fixed in place on the housing, which absorbs forces being created when operating the apparatus, the kinematic properties of the gripper apparatus are also improved. The remaining components are stressed less extensively or not at all, and accordingly can be designed with a reduced wall thickness.

On its free end, the respective control rod advantageously has a fixed first sealing element, which is sealingly seated against the recess, against which the respective gripper finger can be moved in the stroke direction. In this way it is assured that the gripper fingers can be moved back and forth without a pneumatic or hydraulic medium, which is used in this connection, being able to escape.

It has been shown to be structurally simple and therefore advantageous that the respective control rod has a first sealing element on its free end, which sealingly rests against the recess and against which the respective gripper finger can be moved in the stroke direction.

For opening the gripper fingers, a flowable medium is introduced into the cylinder chamber between the front face of a respective control rod and the bottom of the recess, in order to move the gripper finger with respect to the control rod. To this end a feed line could be provided inside the gripper finger. In contrast to this, in a preferred embodiment of the present invention the control rod has a channel extending in its longitudinal direction for introducing the flowable medium into the cylinder chamber sealed by the sealing element. In this way it is possible to omit interfering hose connections to the gripper fingers.

It would be possible to evacuate the above described cylinder chamber for closing the gripper fingers, or the gripper fingers could be moved toward each other in another way, for example by providing a prestress. This is realized in an advantageous manner in accordance with a further concept of the present invention in that the recess of the gripper finger is sealed against the control rod by means of a second sealing element which, together with the gripper finger, can be moved against the control rod and delimits a control chamber between itself and the first sealing element. This control chamber is charged with a pneumatic or hydraulic medium for closing the gripper fingers, so that the second sealing element acts as a piston surface and moves the respective gripper finger in the closing direction.

In this case it has been shown to be advantageous if the second sealing element is maintained in the opening area of the respective gripper finger by means of a securing element.

In a very particularly preferred embodiment of the present invention, the control rod has a second channel, extending in the longitudinal direction, which terminates radially outward into the control chamber in the direction toward the free end of the control rod ahead of the sealing element. This channel, or respectively the flowable pneumatic or hydraulic medium contained therein, is then put under pressure for closing the gripper fingers, and the other channel is made pressureless, so that the respective gripper finger can be pushed on the respective control rod.

In an advantageous manner the gripper apparatus can have a cover, extending over the control rods and the areas of the gripper fingers which are movable on the control rods, which can be fixed on the center part fixed in place on the housing. Preferably the cover can be easily removed and gives the apparatus a compact appearance.

According to a further development of the present inventive concept, the cover rests with its opposite front faces against the holding sections of the gripper fingers when the gripper apparatus is closed, i.e. when the gripper fingers are in their position where they have been moved toward each other.

For this reason it has furthermore been shown to be advantageous if in their closed position the gripper fingers rest against the center section fixed on the housing with their front faces facing each other. An unambiguous reference position is created by this.

Further characteristics, details and advantages of the present invention ensue from the attached claims and from the drawing representation and a subsequent description of a preferred embodiment of the parallel gripper in accordance with the present invention.

DESCRIPTION OF THE PREFERRED EMBODIMENT

Figure 1:
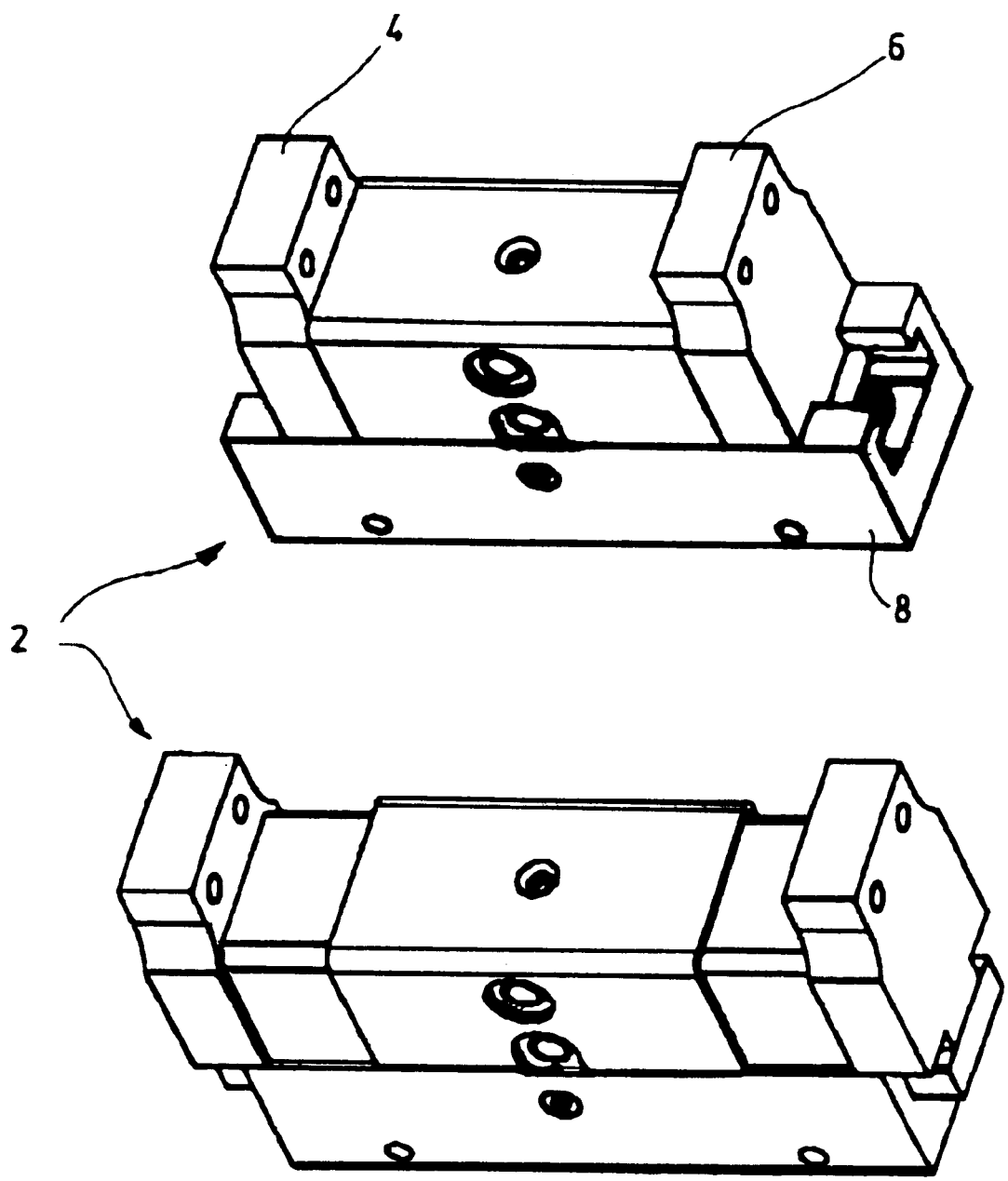
FIG. 1, a perspective view of a parallel gripper in accordance with the present.

FIG. 1 shows a parallel gripper apparatus, identified as a whole by the reference numeral 2, in a closed gripping position and in an opened release position, in which the two gripper fingers 4, 6 are spaced apart from each other farther than in the gripping position.

Figure 2:
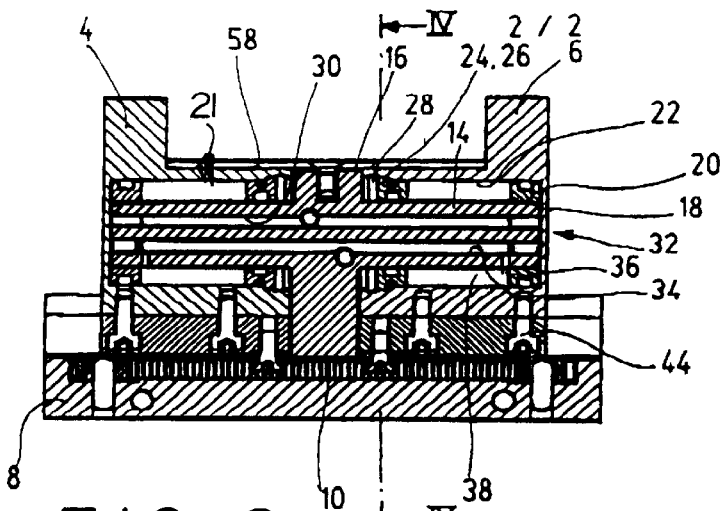
FIG. 2, a longitudinal section along the stroke direction of the gripper in FIG. 1 in its closed position.
Figure 4:
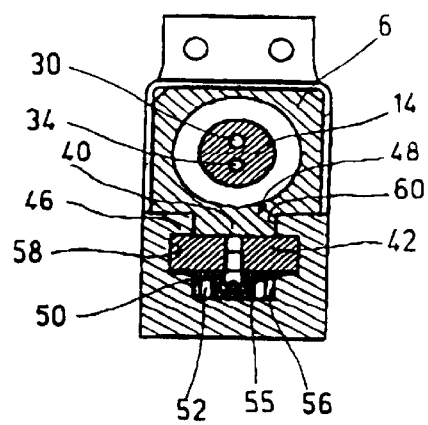
FIG. 4, a section along the line IV—IV of FIG. 2.
Figure 3:
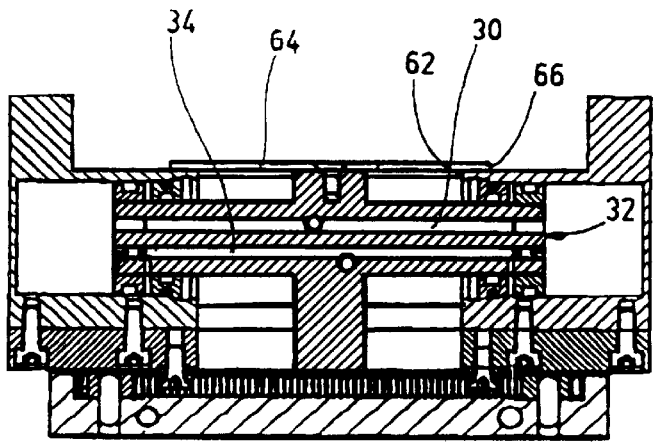
FIG. 3, a longitudinal section of the gripper in FIG. 1 in its open position.
Figure 5:
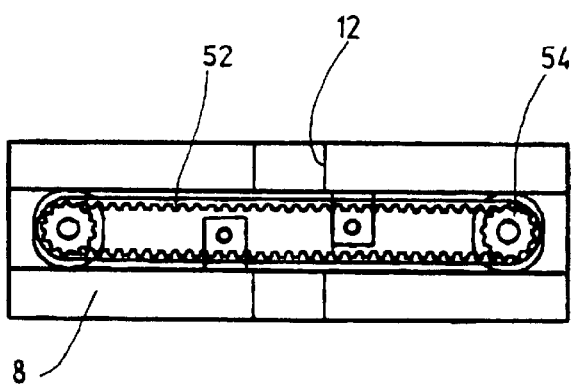
FIG. 5, a top view on the housing base body in FIG. 1 with sketched in engaging elements.

As can also be seen from the sectional views in FIGS. 2 to 4 and in FIG. 5, the apparatus comprises a housing base body 8 and a housing center section 10 fixed in place on the base body 8 and inserted into a recess 12 (FIG. 5) provided transversely with respect to the stroke direction of the gripper apparatus in the housing base body 8. A fixed control rod 14 which, in a preferred manner is made of a single rod-shaped component, extends from the center section 10 in the stroke direction on both sides and is guided through a passage 16, extending in the stroke direction, through the center section 10. A fixed, piston-like sealing element 20 is provided at the respectively free end 18 of the control rod 14. Gripper fingers 4, 6 are displaceably arranged around the respective control rod 14. Each gripper finger 4, 6 has a surface 22, which forms a cylinder chamber 21, in which the control rod 14 enters with its sealing element 20. Here, the sealing element 20 rests sealingly against the wall defining the surface 22. A second sealing element 26 is provided on the free opening end 24 of the gripper fingers 4, 6, which is held on the respective gripper finger 6 by means of a snap ring-shaped security element 28 and is movable together with it with respect to the control rod 14. A channel 30 extends in the longitudinal direction of the control rod 14, which terminates at the front face 32 of the control rod 14, and therefore in the cylinder chamber 21, and which can be connected to an apparatus (not shown) for generating pneumatic or hydraulic pressure.

A second channel 34 extends in the control rod 14 parallel with the channel 30 which, however, was closed on the front face 32 and instead terminates via a radial opening 36 in a control chamber 38. The opening is provided, viewed in the direction toward the free end 18 of the control rod 14, before the sealing element 20. The control chamber 38 is formed by an annular chamber between the control rod 14 and the boundary of the surface 22 of the gripper finger 6, and is delimited in the longitudinal direction by the first sealing element 20 and the second sealing element 26.

On the side facing the housing base body 8, the gripper fingers 4, 6 have a block-like protrusion 40, on whose front face a cube-shaped sliding block 42, made of a sliding material, which is wider than the protrusion 40 is releasably attached by means of screws 44, so that an undercut 46 is formed by this. As can be seen from FIG. 4, a T-shaped groove 48, extending in the longitudinal direction, is formed in the housing base body 8, behind which the sliding block 42 extends, so that a guide for one of the respective gripper fingers 4, 6 is formed.

An engaging element 50 is provided on the side of the sliding block 42 facing away from the respective gripper finger 4, 6, which extends in the direction toward the bottom of the groove 48 extending in the longitudinal direction and, as can be seen in FIG. 5, is in driving connection with a toothed belt 52. The toothed belt 52 is closed and is guided over two toothed belt pulleys 54. In this case the respective engaging element 50 of the two gripper finger sides is connected with oppositely located sections of the toothed belt 52, so that a synchronous, opposed coupling between the two gripper fingers 4, 6 is achieved.

As can be seen from FIGS. 4 and 5, the groove 48 has a narrowed section 56, which constitutes the groove bottom 55. The section 56 makes a transition into a widened section 58, in which the sliding block 42 is received. A groove section 60, again narrowed with respect to it and open toward the gripper fingers, receives the block-like protrusion 40 of the gripper fingers 4, 6. The toothed belt 52 as well as the toothed belt pulleys 54 are housed in the narrowed section 56 constituting the groove bottom 55.

For opening, or respectively spreading open the gripper fingers 4, 6, the channel 30 is charged with compressed air, which enters the cylinder chamber 21 at the front face 32 of the control rod 14 and performs work at the respective gripper finger 4, 6, in that the latter are pushed toward the outside and the volume of the cylinder chamber is increased thereby. In the process the respective gripper fingers 4, 6 with the attached sliding block 42 are displaced with respect to the housing base body 8 and, in the representation in accordance with FIG. 5, the toothed belt 52 is moved in a clockwise direction. The opening, or respectively closing movement of the two gripper fingers 4, 6 is exactly synchronous with respect to each other by means of this forced guidance. There is no jamming of individual components, and the friction occurring in connection with this can be neglected.

In order to move the gripper finger 4, 6 again back toward each other, the pressure from the channel 30 is removed by a suitable control, and the channel 34 is put under pressure. Now the flowable medium reaches the control chamber 38 via the radial opening 36 and displaces the piston-like sealing element 26, because of which the gripper fingers 4, 6 are moved into their closing position and the volume in the control chamber 38 is increased.

A reference position for the closed position of the two gripper fingers 4, 6 is provided in that their facing front ends 62 rest against the center section 10 in the closed position. A cover 64 of a comparatively thin wall thickness extends over the center section 10 and rests with its front faces 66 against the holding sections of the gripper finger 4, 6 when the latter are in their closed position.

What is claimed is:

1. A gripper apparatus, comprising:

a housing body including a center part fixed within said housing;

a pair of spaced apart gripping fingers disposed in said housing body to move toward and away from said center part, and consequently toward and away from each other, said movement toward each other defining a closing direction of movement and said movement away from each other defining an opening direction of movement, each of said gripping fingers having a surface defining a chamber extending in the opening and closing direction and having a closed bottom;

a control rod fixed to said center part and extending in said opening and closing direction and in engagement with said chamber of each gripping finger, said control rod defining at least one free end and a first and second channel extending in the longitudinal direction in a control rod a second sealing element and its associated first sealing element define a control chamber;

a first sealing element fixed to said free end of said control rod, said first sealing element being sealingly seated against said surface defining said respective chamber;

a second sealing element which engages said surface defining said respective chamber, said second sealing element being movable with its respective gripper finger against said control rod; and means for connecting said second channel to said control chamber, wherein a flowable medium is introduced through said first channel into said chamber sealed by said sealing element.

2. The gripper apparatus as defined in claim 1, wherein said center part has an opening through which said control rod extends.

3. The gripper apparatus as defined in claim 1, further comprising:

a security element for maintaining said second sealing element in engagement with its respective gripping finger.

4. The gripper apparatus as defined in claim 1, wherein said housing body includes a cover fastened to said center part and extending over said control rod.

5. The gripper apparatus as defined in claim 4, wherein said cover has opposed ends which rest against a respective one of said gripping fingers when said gripping fingers are closed relative to each other.

6. The gripper apparatus as defined in claim 1, wherein in the closed position said gripping fingers have their front ends facing each other and in engagement with said center part.

7. The gripper apparatus as defined in claim 1, wherein each gripping finger includes a sliding block constituting an undercut which is displaceably guided in said housing body.

8. The gripper apparatus as defined in claim 1, further comprising:

a toothed belt coupling for synchronizing the movement of said gripping fingers.

9. The gripper apparatus as defined in claim 8, wherein said toothed belt coupling includes two toothed belt pulleys and a closed toothed belt.

10. The gripper apparatus as defined in claim 8, wherein each gripper finger includes an engaging element which engages said toothed belt.

11. The gripper apparatus as defined in claim 9, wherein each gripper finger includes an engaging element which engages said toothed belt.

\* \* \* \* \*

UNITED STATES PATENT AND TRADEMARK OFFICE
CERTIFICATE OF CORRECTION

PATENT NO.         : 6,224,123 B1
APPLICATION NO.  : 08/985871
DATED              : May 1, 2001
INVENTOR(S)        : Ubele et al.

It is certified that error appears in the above-identified patent and that said Letters Patent is hereby corrected as shown below:

Title page, item [73], the assignee "Fritz Schunk GmbH & Co. KG Fabrik fur Spann–und Greifwerkzeuge" should be --Schunk GmbH & Co. KG Fabrik fur Spann– und Greifwerkzeuge--.

Signed and Sealed this

Twenty-first Day of July, 2009

JOHN DOLL
*Acting Director of the United States Patent and Trademark Office*